Patented Sept. 8, 1936

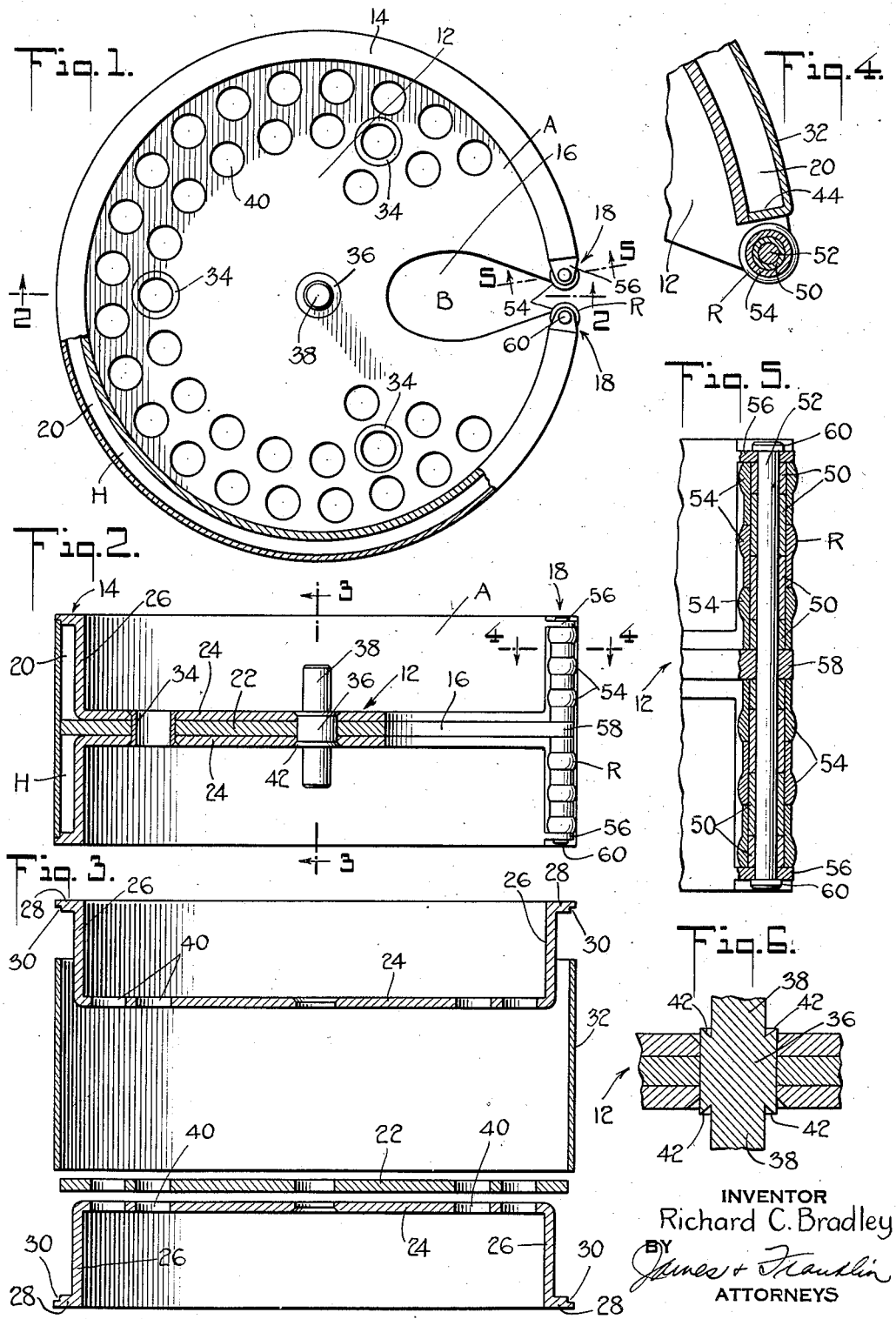

2,053,942

UNITED STATES PATENT OFFICE 2,053,942

PISTON FOR LIQUID METERS

Richard C. Bradley, Brooklyn, N. Y., assignor of one-half to Fred J. Bradley, St. Albans, N. Y.

Application September 27, 1933, Serial No. 691,259

4 Claims. (Cl. 73—257)

This invention relates to liquid meters, and more particularly to the movable driving part thereof, as the piston of a liquid meter of the oscillating piston type.

The primary object of my invention is to generally improve liquid meters, particularly water meters. A more particular object of my invention is to minimize the friction of operation and resulting wear of the movable driving element of such meters. This wear manifests itself at the bottom of the element due to the rubbing of the element on the bottom of the measuring chamber. It also manifests itself at the terminals of the element which straddle or ride on a stationary bridge or partition in the measuring chamber. Separate features and objects of my invention deal with and minimize each of these sources of wear.

Still another object of my invention resides in the provision of a liquid meter suitable for use with hot water. This problem is of especial importance not only because no satisfactory hot water meter of this class has heretofore been devised, but also because in houses and buildings and the like, every cold water meter should by preference be capable of withstanding hot water, this being due to the fact that over-heating of a hot water heater or boiler in the house causes hot water to back up into the main water supply line, thereby exposing the cold water meter to the attack of hot water. Still another object of the present invention is to provide an improved assembled meter part which may be manufactured at low cost.

To the accomplishment of the foregoing and such other objects as will hereinafter appear, my invention consists in the liquid meter part and the elements thereof and their relation one to the other as hereinafter are more particularly described in the specification and sought to be defined in the claims. The specification is accompanied by a drawing in which:

Fig. 1 is a partially sectioned plan view of a liquid meter piston embodying features of my invention;

Fig. 2 is a section taken in the plane of the line 2—2 of Fig. 1;

Fig. 3 shows the main parts of the meter before assembly, on section line 3—3 of Fig. 2;

Fig. 4 is a section taken in the plane of the line 4—4 of Fig. 2;

Fig. 5 is a section taken in the plane of the line 5—5 of Fig. 1; and

Fig. 6 is a section taken in the plane of the line 3—3 of Fig. 2, showing a detail of the post.

My invention is shown embodied in a piston for the oscillating piston type of meter. There is a generally circular driving element A which is cut away radially at B to receive the bridge of the meter casing, this construction being conventional. In accordance with my invention, the edges of the cut-away portion are provided with roller bearings R in order to reduce the friction of contact between the driving element and the bridge. In accordance with a further feature of my invention, the body A is made hollow, as shown at H, and leak-proof in order to lighten and retain its full buoyancy. The element is preferably assembled out of sheet metal parts, as shown, thereby making the same light, inexpensive, and resistant to hot and cold water, or other liquids, if desired.

Considering the arrangement in greater detail, the piston is conventional in comprising a circular web 12 surrounded by a main cylindrical flange 14 at the periphery of web 12. The flange and web are cut away at 16 to receive the bridge of the measuring chamber. As is well known to those skilled in this art, the measuring chamber is in the form of a shallow cylinder having top and bottom plates between which the piston may slide. The measuring chamber is somewhat larger in diameter than the piston, so that the piston may oscillate therein. A radial bridge or partition extends inwardly from the wall of the chamber at one point, and this bridge extends into the cut-away space 16 and prevents rotation of the piston. The chamber is, of course, also provided with appropriate inlet and outlet ports relative to which the piston moves. The piston oscillates about the measuring chamber, during which movement the bottom edge of the piston slides on the bottom of the chamber, and the terminal points 18 of flange 14 bear against and slide on the bridge. Neither the measuring chamber nor the complete meter has been illustrated because the meter aside from the piston may be of conventional type, and, in fact, the present piston is intended to be interchangeable with the piston heretofore employed.

The piston is conventionally made of solid cast metal, and, if a water-resistant metal such as bronze is employed, the piston is quite heavy, resulting in substantial wear on the bottom edge of the flange 14. This wear causes leakage space between the top edge of the piston and the top wall of the chamber. To overcome this difficulty it has been proposed to cast the piston of aluminum in order to lighten the same, but aluminum is subject to attack by ordinary city water supply and is wholly unsatisfactory for use as a water meter. These pistons have also been molded of hard rubber which may be used in a cold water meter but which possess a number of disadvantages the outstanding one of which is that when exposed to hot water the piston is softened and swollen to a shapeless mass. Many cold water meters have been ruined by backing up of hot water into the cold water main.

In accordance with the present invention the piston is lightened while utilizing dense metals, by making at least a portion of the piston, preferably the flange 14, hollow, as is indicated at 20. This reduces the weight of the piston, and, by making the hollow chamber leak-proof, the piston is substantially lightened not only by reason of the direct reduction in mass, but also by retaining the full buoyancy of the piston volume immersed in the liquid filling the meter.

The piston is preferably assembled out of a plurality of pressed sheet metal parts, this construction resulting not only in a superior piston, but greatly reducing the cost of manufacture of the same. Specifically, in the present case I assemble the piston out of a center plate 22 and dished side plates 24, the latter being dished to form the inner flange walls 26. The forming or pressing operation for the side plates preferably also forms the marginal or edge flanges 28 which may be stepped or recessed to form an annular seat 30. The main flange 14 is completed by a generally cylindrical band 32 dimensioned to be received between the side plates 24 and to fit into the seats 30. Center plate 22 is preferably made equal in diameter to the internal diameter of band 32, thereby strengthening the band and permitting thin metal to be used. The main parts of the piston are shown in Fig. 3, and when these parts are closed together they form the assembly shown in Fig. 2.

Center plate 22 and side plates 24 are secured together to form the main web 12 by appropriate securing means here exemplified by three tubular rivets 34 and the riveted hub 36 of center post 38. The web 12 is anyway provided with a considerable number of holes or passages 40 to permit free flow of liquid through the web, and some of these holes may be enlarged to receive the tubular rivets 34. Post 38 is anyway provided for guiding the piston in its oscillatory movement and for communicating its movement to the registering or totalizing mechanism of the meter. The post is initially formed with a hub 36 having undercut ends 42, as is best shown in Fig. 6. When the piston is assembled, the ends 42 may be swaged or riveted downwardly to help lock the parts of the piston in assembled relation, as shown in Fig. 2.

The hollow chamber 20 in the piston is preferably sealed against leakage, as by welding, brazing, or soldering the parts together, one or another of these methods being employed depending upon the metal used. This metal may be brass, stainless steel, or any suitable rust-proof metal not subject to attack by the liquid with which the meter is to be employed. The ends of band 32 are bent inwardly, as is best shown at 44 in Fig. 4, in order to close the ends of the hollow chamber 20.

To reduce the friction of contact between the terminals 18 of the piston flange with the stationary bridge of the measuring chamber, I provide these terminals with roller bearings. Specifically, I mount a series of short independently rotatable inner tubular bearings 50 on a main bearing pin 52, and I further mount a series of short independent tubular outer bearings 54 around the inner bearings 50. The ends of the inner and outer bearings are preferably staggered, as is clearly shown in Fig. 5 of the drawing. The outer bearings 54 may be beaded, as shown, to reduce the area of contact between the bearings and the bridge. Pin 52 is supported in stationary end bearings 56 and a stationary center bearing 58, the latter being formed on the center plate 22, and the former being formed on the side plates 24. The end bearings 56 are thinned down sufficiently to make room for the heads 60 of pins 52.

It will be understood that the mere provision of roller bearings in any form greatly reduces the friction between the piston and the bridge. The subdivision of the bearings into short independent lengths helps prevent sticking or locking of the bearings, because, should one element lock, the remaining elements may nevertheless rotate. Similarly, the provision of independently rotatable inner and outer bearings helps prevent locking, because relative rotation may take place either between the inner and outer bearings or between the inner bearing and the pin.

It is believed that the mode of constructing and using my improved movable driving element for liquid meters, as well as the many advantages thereof, will be apparent from the foregoing detailed description. The element is substantially frictionless, capable of indefinite wear, useful with hot or cold water, and inexpensive. Any liquid may be handled by selecting an appropriate metal or alloy resistant to attack by that liquid.

It will be apparent that while I have shown and described my invention in preferred forms, many changes and modifications may be made in the structures disclosed without departing from the spirit of the invention, defined in the following claims.

I claim:

1. A piston for a liquid meter of the oscillating type, said piston comprising a center plate and dished side plates pressed out of sheet metal and assembled in face to face relation to form a laminated circular web and a cylindrical flange at the periphery of the web, a cylindrical sheet metal band surrounding the cylindrical flange and forming a hollow leak-proof enclosure for the peripheral flange.

2. A piston for a liquid meter of the oscillating piston type, said piston comprising a center plate and dished side plates pressed out of sheet metal and assembled to form a circular web and a cylindrical flange at the periphery of the web, said flange having peripheral annular seats, a cylindrical sheet metal band surrounding the cylindrical flange and forming a hollow leak-proof enclosure for the peripheral flange, the center and side plates being held together by tubular rivets and a central post, the band being set into and held in place between said annular seats formed on the side plates, and the parts being appropriately secured together to form an integral leak-proof hollow piston.

3. A piston for a liquid meter of the oscillating piston type, said piston comprising a center plate and oppositely dished side plates pressed out of sheet metal and assembled with the center portions thereof in face to face relation to form a solid laminated circular web and a cylindrical flange at the periphery of the web, said center plate being larger in diameter than the aforesaid cylindrical flange, a cylindrical sheet metal band surrounding the periphery of said center plate and being thereby spaced from the cylindrical flange, and means sealing the aforesaid space to form a hollow leak-proof enclosure at the periphery of the piston.

4. A piston for a liquid meter of the oscillating piston type, said piston comprising a center plate and oppositely dished side plates pressed out of sheet metal and assembled with the center portions thereof in face to face relation to form a solid laminated circular web and a cylindrical flange at the periphery of the web, said side plates being bent outwardly at the upper and lower edges of the aforesaid flange to form radially projecting annular walls, said center plate being larger in diameter than the cylindrical flange and projecting outwardly therefrom by an amount approximately equal to the projection of the aforesaid annular walls, and a cylindrical sheet metal band surrounding the periphery of the aforesaid center plate and secured at its upper and lower edges to the aforesaid annular walls.

RICHARD C. BRADLEY.